UNITED STATES PATENT OFFICE.

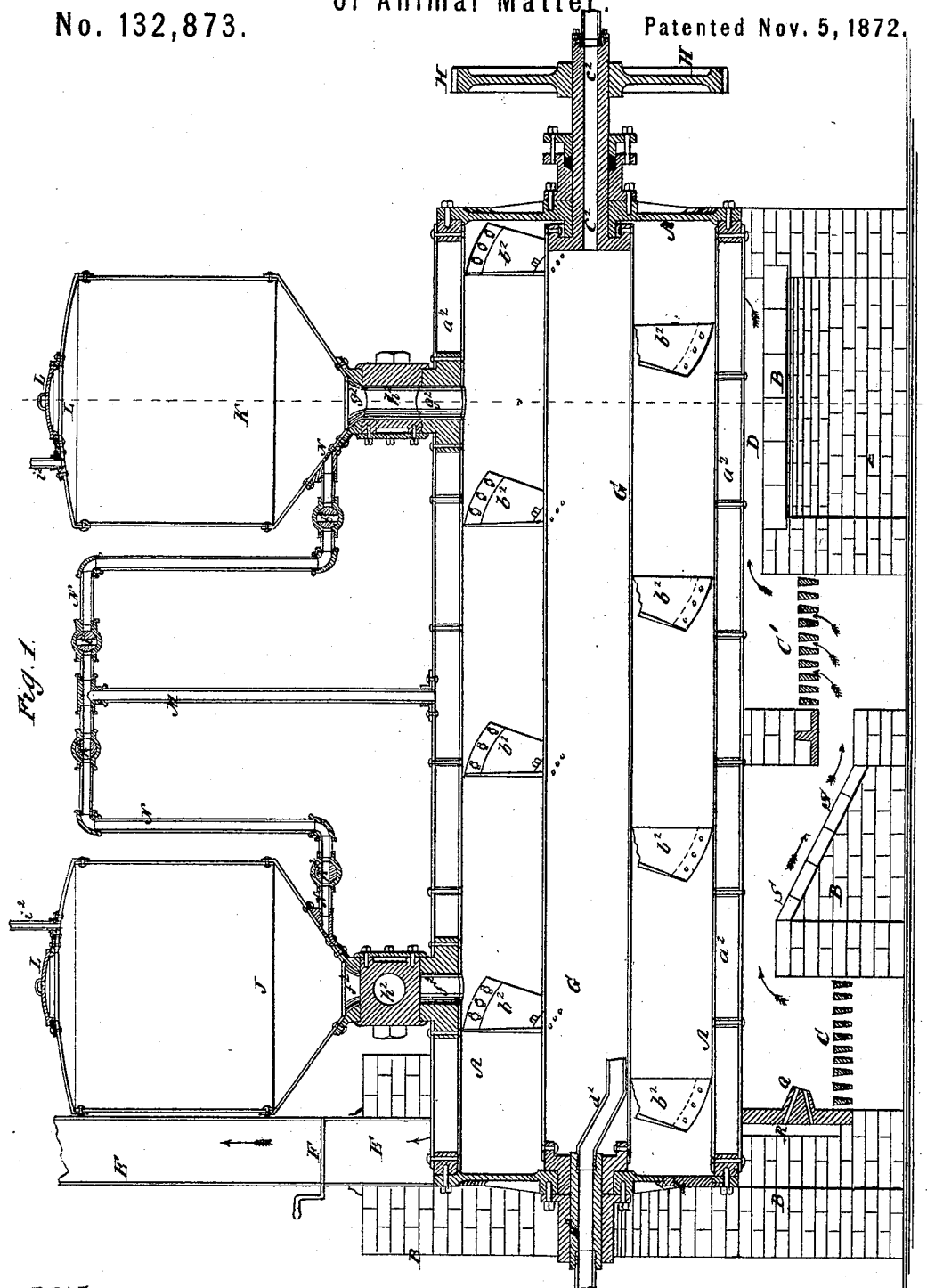

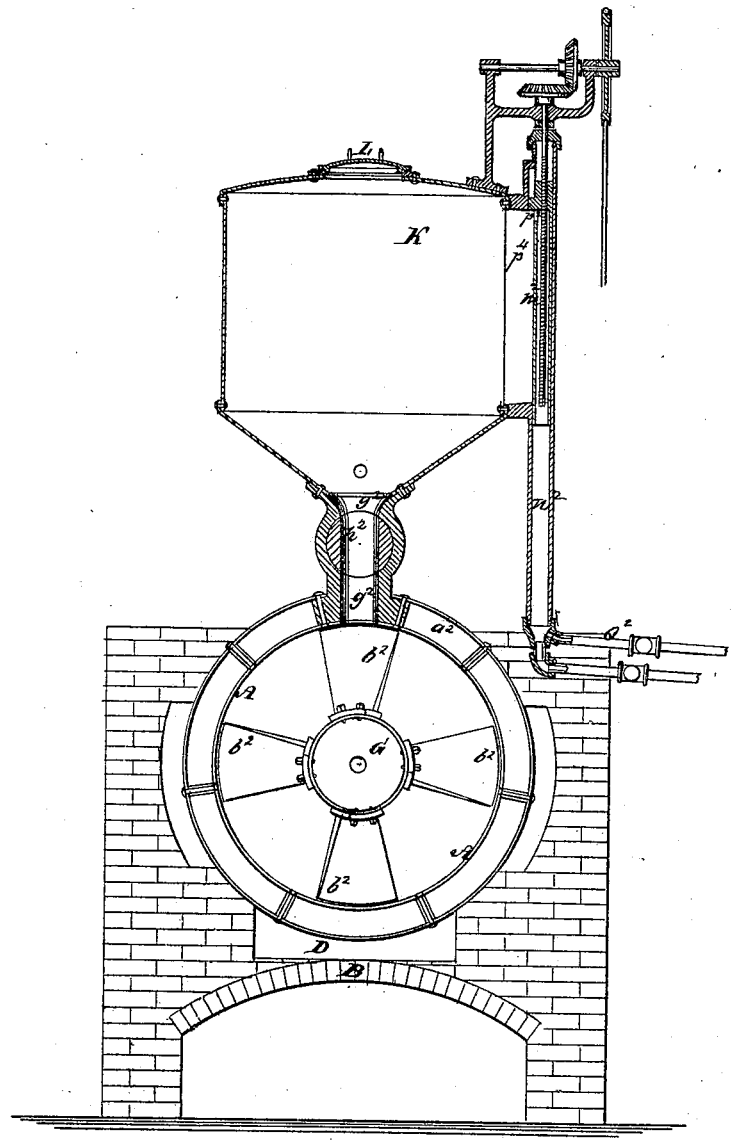

MICHAEL J. STEIN, OF NEW YORK, N. Y.

IMPROVEMENT IN PROCESSES AND APPARATUS FOR THE TREATMENT OF ANIMAL MATTER.

Specification forming part of Letters Patent No. 132,873, dated November 5, 1872.

*To all whom it may concern:*

Be it known that I, MICHAEL J. STEIN, of New York city, in the State of New York, have invented a new Process and Apparatus for the Treatment of Animal Matter; and I do hereby declare that the following is a full and exact description thereof, reference being had to the accompanying drawing making part of this application.

My invention relates to a new and useful process for the treatment of animal matter in the manufacture of fertilizers; and also to certain new and useful improvements in apparatus or machinery adapted particularly to carrying on my new process, but applicable with some advantages to the conduct of other processes.

In order to give a full and clear exposition in one application and specification of both my new process and my improved apparatus without unnecessary prolixity, I deem it most expedient to speak, first, of the process, and then of the apparatus, as after having pointed out the characteristic features, objects, and advantages of my new process a succeeding description of the apparatus and its operation will at the same time explain the manner of conducting my new process, and its effects and results.

Process.

Previous to my invention it has been customary in processes of rendering out the fat from animal matters to introduce water into the digester or rendering vessel containing the charge of animal matter, and at the conclusion of the rendering operation allow the digester to cool down (to a greater or less extent) and the fat to rise to the top of the liquid contents of the vessel, and then to float the fat up by the introduction of a further supply of water, and discharge it through a draw-off cock or an exit-passage at some given point, and after thus getting rid of the fat to draw off from the vessel containing the charge all the water or "soup" (which was composed of the water in which the rendering-process was conducted and the auxiliary supply let in to flood the vessel and float off the stratums of fat) through a cock or exit located somewhere near the bottom of the digester. After which the scrap was removed through a man-hole to some locality (at which the nuisance created would be tolerated) for further manipulation. Of the many very serious objections to this heretofore generally practiced process, some have been overcome by improvements lately patented to me. By my patented continuous process and apparatus for conducting the same the greater part or all of the nuisance generally created is avoided, and the great objections to flooding the rendering-vessel to float off the fat—thus wasting heat, lengthening, and making more expensive and laborious the process, and mixing with the great quantity of water necessary a large percentage of the organic matter of the charge, or, in other words, making an unnecessarily large quantity of soup—have been overcome. But in both the customary and my improved processes, whatever soup is left in the digester or vessel after the fat is drawn is thrown away (either with or without being subjected first to some purifying or disinfecting operation) and all its contained and valuable organic matter is lost.

It has been established, by analysis and scientific estimates made by Professor C. F. Chandler, S. W. Johnson, and other eminent chemists, that one thousand gallons of "meat-soup" contain over one hundred and twenty-five pounds of ammonia, and about fifteen pounds of phosphoric acid.

I propose by my invention to save the highly-concentrated soup (which is generally thrown away) resulting from the rendering process, and utilize all its contained valuable fertilizing properties or chemical qualities, and thus save and utilize, in the manufacture of fertilizers, valuable matter which is now entirely wasted.

To these ends and objects my invention consists in subjecting the soup of the rendering process (either together with and in the vessel containing the solid matter, or separately in another chamber, so connecting to the rendering-tank as to permit the removal into it of the soup without exposure of the latter) to a process of evaporization alone, or to an evaporating process and auxiliary process of precipitation and filtration combined, as will be hereinafter more fully explained, whereby I am enabled to distill out all the liquid portion of the soup and save all its contained organic and chemically useful ingredients.

Where I employ only the process of separating the water from the other contained matters of the soup by evaporization, I subject the soup to the action of heat in a closed vessel (either that in which the rendering has been done or in another connected therewith, and into which the soup is run, and either separately from or together with the solid matter or scrap) and carry off the vapors and steam generated by any suitable means, and dispose of them in any desirable manner, leaving in a dry condition in the said closed vessel the residuum or organic matter.

When the process of extracting from the soup all its organic matter is performed simultaneously with and in the same vessel which contains the scrap, the charge of scrap will be enriched and rendered more valuable in proportion to the whole quantity of animal matter and chemical ingredients contained in the charge of soup treated.

When the quantity of soup is very great and the proportion of contained organic matter small, (which is the case where the old-fashion process of flooding the rendering-chamber or digester with a large additional supply of water to float off the fat is used,) it may be found more economic and expedient, in lieu of consuming a sufficient quantity of fuel and expending the time and labor to treat such diluted soup by the process of evaporization, to allow the soup to stand for some time in the vessel (either the separate one into which it may have been run, or, together with the scrap, in the digester) and permit a precipitation of a large portion of its contained organic matter; then draw off the upper diluted portion of the liquid mass and treat only the lower portion, which is more pregnant with valuable matter; and when this course is followed I propose, by an auxiliary and comparatively inexpensive process, to save and utilize even the small proportion of valuable matter contained in the diluted skimmings. I propose to pass this diluted portion of the soup into and through bone charcoal, and thereby not only deodorize the water of this soup previous to its final escape from the apparatus, but save and utilize, in combination with the bone charcoal in the manufacture of superphosphates, whatever organic matter and chemical properties may be contained in the soup. It will be understood that the mere filtration and arrest by the bone charcoal of the contained organic matter will deprive the escaping fluid of the greater portion, if not all, of its capacity to create unpleasant odors, as at present, by the decomposition of said matter.

In the carrying on of either the single or double process described, or modifications of either or both for the extraction and utilization of the contained matters and properties of the soup, various apparatus may be employed without departing from that part of the subject-matter of my invention which relates to the idea of saving the valuable ingredients of the soup heretofore allowed to go to waste. It is scarcely necessary to remark that the heretofore-practiced system of drawing off the soup at the lower part of the rendering-chamber embraces, as a necessary consequence, the carrying off of much of the solid matter which it is desirable to leave with the scrap, and that, therefore, in practicing my invention under that form in which it is proposed to draw off some portion (the diluted part) of the soup it should always be drawn from near its top surface. For this purpose an apparatus provided with my improved skimmer or fat slide-valve may be used with great advantage.

*Apparatus.*

I will now proceed to describe that part of my invention which relates to the apparatus which (though it may be advantageously used in carrying on other processes) I have devised for the purpose of conducting my new process.

In the accompanying drawing forming part of this application, I have shown, at Fig. 1, in longitudinal section through the center, and at Fig. 2, in cross-section, my improved apparatus.

In the several figures the same part will be found designated by the same letters of reference.

A is a cylindrical drying-vessel or closed chamber, formed with a surrounding steam-space or jacket, $a^2$, and mounted in suitable masonry B over furnaces C C', from which the products of combustion pass through flues D around the vessel A, in a suitable manner, and escape through the usual chimney E, which is provided at F with an ordinary damper for purposes well known. The cylinder A is provided with a hollow shaft, G, which is mounted axially therein so as to turn freely, is provided with helically-arranged agitating and feeding arms $b^2$, and is supplied with steam to heat it through a hollow journal at $c^2$. This hollow rotatory and steam-heated shaft or drum G is provided at the end opposite that where the steam enters with a discharge-pipe, $d^2$, arranged in the hollow journal $e^2$, on which said drum turns; and said drum is also provided at its hollow extended portion $c^2$ with a gear, H, by means of which it may be rotated, at pleasure, in different directions by any suitable driving mechanism. I is a discharge-door or man-hole, through which the contents of the vessel A may be discharged. J and K are two similarly-constructed rendering-vessels or digesters, which I have represented as being arranged immediately over (which is not necessary or always convenient) the cylinder A. They communicate at their bottoms with the interior of vessel A through connecting-passages $f^2$ $g^2$, which may be opened and closed at pleasure by means of cocks or valves $h^2$. These rendering-vessels or digesters may be made jacketed or not, and of any suitable form, size, or pattern, and are provided with the usual man-hole at L for the introduction of the charge, with pipes $i^2$ for carrying off any noxious gases, steam, &c., and with other suitable appliances of closed rendering-vessels. M is a pipe leading upward from the steam-space $a^2$ of the drying-chamber A, and connected, by branch-pipes N N, to the two digesters J K near their bottoms, as shown. Through the medium of these pipes, and by turning the valves or cocks $k^2$ $k^2$ and $l^2$ $l^2$, steam is admitted to either of the digesters, at pleasure, from the steam-space $a^2$, to heat up the contents of J or K and effect or assist the rendering of its contained charge. At Fig. 2 will be best seen the device or appliances by which the liquid fat is drawn off from the rendering-vessel. Each of the vessels J K is provided with one of these fat-skimming valves, which is composed, as seen, of a sliding tube, $m^2$, arranged to move vertically in a tube, $n^2$, which communicates at its lower end with the exit-pipe $o^2$, while tube $m^2$ communicates near its upper end, at $p^2$, with the chamber $p^4$. No particular description of this fat-skimming valve and its operating mechanism need be given here, as it will be found in detail in some of my prior patents, where it is made part of the subject-matter of invention. At Q is an Argand-burner device, to which the noxious gases and vapors from the rendering or drying vessels (or both) are supplied from a chamber, R, to which they are conducted by suitable means, and from this burner the said gases escape into the combustion-chamber over the fire-bed of furnace C in a manner well known. The furnaces C and C' I have represented as arranged one behind the other, and in line in direction of the length of cylinder A, and in such a manner that all the products of combustion arising in the fire-box of furnace C must pass through the descending flue S, as indicated by the arrows at Fig. 1, and thence up through the grate-bars of furnace C'. One part of this arrangement relates to one feature of my improved apparatus, while the other forms another feature.

The several characteristic features which constitute the several improvements in, or that part of my invention which relates to, the apparatus are, first, such an organized arrangement of one or more rendering-vessels and one or more drying-chambers with the furnace or furnaces or the steam-generating apparatus that the same heating medium which is generated for use in connection with either of said vessels may be used for heating the other. Second, the combined arrangement of a rendering-tank with a steam-heated drying-chamber and suitable means of connection, so that the steam employed to heat the drying-chamber (by radiation) may be injected into or around the rendering-tank and its contained charge. Third, the combination, with one or more drying-chambers or vessels, of one or more rendering-tanks or digesters, and suitable means of communication between them at any distance or angle, whereby the whole or any portion of the contents of one or several rendering-vessels may be discharged into a drying-chamber without exposure. Fourth, the combination, (either in the arrangement shown or any other,) with any receptacle of gases or vapors which it is desired to destroy by combustion, of a series of fires or furnaces so arranged that the gases or vapors, which are let into the combustion-chamber (over the fire-bed) of one furnace shall be forced to pass up through the bed of the fire of another furnace. Fifth, the arrangement of a series of such gas-consuming furnace with the vessel in which such vapors or gases are generated, so that the products of combustion of said furnaces shall assist in or perform the heating up of said vessel.

These several characteristic features will be made more clear by the following explanation of the operation of my improved apparatus in the conduct of my new process. One or more of the digesters being charged with the animal matter to be rendered and sealed up in the usual manner, and the requisite heat generated in the furnaces, steam is generated in the boiler portion of shell $a^2$ in the drying-cylinder, and from the upper portion of the shell $a^2$ the steam is conveyed through the pipes M and N to one or more of the digesters, which it enters near the bottom, and, passing up into and through the mass of contained material, effects the rendering in the manner well known. Whenever the rendering process may have been thus sufficiently conducted in any one or all of the digesters J K, the steam is cut off and the fat allowed to rise and settle on top of the "soup." I then put in operation the fat-skimming valve and draw off all the liquid fat, and open the passage between the digester or digesters and the drying-chamber A by turning the cock or valve $h^2$, as shown at Fig. 1, and let the contents of the rendering-chamber (that is, all the "soup and scrap") into the vessel A, where I subject it to the action of the steam-heated surfaces, while in a constant state of agitation, (created by the revolutions alternately in opposite directions of the beater-arms $b^2$ and the shaft G,) until all the water is evaporated out. The steam and gases generated are passed off, under suitable control, into the superheaters, and thence into the Argand-burners Q, from whence they escape into furnace C and are consumed, as will be presently explained. During the drying process of one charge the rendering-tank J or K, or both, may be recharged, and the rendering be reconducted therein, and with a larger series of rendering-vessels the scrap and soup from all may be conveyed into the one drying apparatus, which may be situated at any desirable point and properly connected.

The construction and operation of the devices by which the gases and vapors generated are conducted to the combustion-chamber of the furnace C, and therein mingled with the products of combustion of the fire, are the same as described and shown in other patents to me; but in lieu of permitting the mingled (and perhaps partially destroyed) gases with the products of the fire to pass off from the furnace, as heretofore, I propose in my improved apparatus to take them in this mingled and highly-heated condition and force them onto another fire, and pass them through the bed thereof, as shown and described, whereby the combined products, which before passed off, are forced to enter beneath the grate-bars and pass up through an auxiliary fire, together with the air supplied to said fire. This operation may be repeated any number of times, and for the purposes of this part of my invention the furnaces need not be arranged under or in direct connection with the vessel A so long as they receive and treat the gases to be consumed in the manner shown and explained; but by the arrangement of these gas-consuming furnaces, as shown, they are made to perform, in a most economical and efficient manner, the heating up of the boiler of the drying apparatus, and, if desired, to generate steam for the rendering apparatus.

It will be seen that by the arrangement of the rendering-vessel with the steam-heated drier, as described, a most economic and convenient means for heating from one furnace or source both the drying and rendering apparatus is attained; but it will be understood that this feature of my invention may be employed independently of the other and broader one, which consists in any arrangement of both drying and rendering vessels so that the same heating source, whether steam, hot air, or both, shall supply the heating medium to all of them. This last-named part of my improvements may be carried out under various modifications of apparatus and by a construction different from that shown.

By extending the steam-supply pipe M up to the level of the top of the digesters, and the branch-pipes N from thence down, as shown, and providing each of the pipes N with two cocks, (one above and one below,) all possibility of any particles of matter floating from the digester up and into the stand-pipe M and thence into the steam-jacket is prevented.

In the construction of my improved apparatus many modifications may, of course, be made, and many variations in the details effected without changing its characteristic features; and in the carrying out of my new process either the apparatus shown or some other may be employed; and, in the practice of the auxiliary process of filtration of the diluted portion of the soup, in lieu of subjecting the whole mass at once to the described process of evaporization, any suitable filtering apparatus may be employed.

In the treatment of animal blood my improved apparatus can be used to great advantage, the rendering-digester being used for coagulating the blood, which is then let down into the drying apparatus, and another charge coagulated while the first is being dried, and so on, using one part of the apparatus for doing the coagulating while the other part is doing the drying.

Having so fully explained my invention that those skilled can understand and practice my new process and construct and use my improved apparatus, what I claim as new in the treatment of animal matters is—

1. The utilization of the valuable properties and ingredients of the soup of the rendering process by evaporating out the water, substantially as described.

2. I also claim the auxiliary process described, by which the dilute portions of the soup are treated for the extraction and utilization of the contained organic matter, and the prevention of smell from the waste liquor.

And what I claim as new in my improved apparatus, and desire to secure by Letters Patent, is—

1. The combination of one or more rendering and one or more drying vessels, with one source of supply of the heating medium, as and for the purpose described.

2. In combination with a steam-heated drying apparatus one or more rendering-vessels, the whole so arranged and operating that the steam for heating the surfaces of the drier may be introduced into or around the contained charge of the rendering vessel or vessels.

3. The combination of a rendering apparatus or digester with a drying chamber or apparatus in such a manner that the whole or any portion of the contained charge of the former may be conducted into the latter, substantially as and for the purposes described.

4. A series of furnaces so constructed and connected, and so combined with a vessel or vessels in which vapors or gases are generated, that the said gases or vapors may be passed into the combustion-chamber of one furnace and thence up through the grate-bars or fire-bed of another, substantially as and for the purposes described.

5. The arrangement of a series of gas-consuming furnaces with the vessel or vessels in which the gases consumed by them are generated, so as to supply the necessary heat of said vessel, substantially as hereinbefore set forth.

In testimony whereof I have hereunto set my hand and seal this 31st day of October, 1872.

MICHAEL J. STEIN. [L. S.]

Witnesses:
 GEO. A. GREENSWARD,
 J. FELBEL.